US012586080B2

(12) United States Patent
Ge et al.

(10) Patent No.: US 12,586,080 B2
(45) Date of Patent: Mar. 24, 2026

(54) METHOD AND SYSTEM FOR IDENTIFYING TRENDING TOPICS IN CUSTOMER INQUIRIES

(71) Applicant: Microsoft Technology Licensing, LLC, Redmond, WA (US)

(72) Inventors: Xinhui Ge, Sammamish, WA (US); Veeravenkata Satya Sridhar Maddipati, Issaquah, WA (US); Venkatasatya Premnath Ayyalasomayajula, Sammamish, WA (US); Nikhil Verma, Sammamish, WA (US); Mara Saveliev, Redmond, WA (US); John Theodore Nassif, Sugar Hill, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 18/449,106

(22) Filed: Aug. 14, 2023

(65) Prior Publication Data

US 2025/0061465 A1     Feb. 20, 2025

(51) Int. Cl.
*G06Q 30/015*         (2023.01)
(52) U.S. Cl.
CPC .................................. *G06Q 30/015* (2023.01)
(58) Field of Classification Search
CPC ..................................................... G06Q 30/015
See application file for complete search history.

(56) References Cited

U.S. PATENT DOCUMENTS 10,496,637 B2   12/2019   Podgorny et al.
11,650,986 B1    5/2023   Agbemabiese et al.
(Continued)

FOREIGN PATENT DOCUMENTS

WO      WO-2021107982 A1 *   6/2021   ............. G06N 3/045

OTHER PUBLICATIONS

S. He, J. Zhu, P. He and M. R. Lyu, "Experience Report: System Log Analysis for Anomaly Detection," 2016 IEEE 27th International Symposium on Software Reliability Engineering (ISSRE), Ottawa, ON, Canada, 2016, pp. 207-218 (Year: 2016).*

(Continued)

*Primary Examiner* — Jeff Zimmerman
*Assistant Examiner* — Hunter Molnar
(74) *Attorney, Agent, or Firm* — Han Gim; Newport IP, LLC

(57)         ABSTRACT

A system and method for detecting trending topics in customer inquiries includes retrieving customer inquiries from a plurality of data sources for a target time window and reference time windows and detecting trending keywords in the target time window as compared to keywords in the reference time windows. Responsive to detecting the trending keywords, customer inquiries in the target time window that include one or more of the trending keywords are collected and a weight is measured for each collected customer inquiry based on weights of detected trending keywords in each collected customer inquiry. A connection graph is generated for the detected trending keywords and the collected customer inquiries. The detected trending keywords are then clustered into a plurality of trending topics based on the connection graph, and the trending topics are ranked based on the measured weights of the collected customer inquiries associated with each trending topic.

20 Claims, 12 Drawing Sheets

300D ⟍

(56) References Cited

U.S. PATENT DOCUMENTS

| | | | |
|---|---|---|---|
| 2010/0274744 A1* | 10/2010 | Brdiczka ................. | G06N 5/02 |
| | | | 706/58 |
| 2012/0278365 A1* | 11/2012 | Labat ................. | G06F 16/9024 |
| | | | 707/798 |
| 2016/0239847 A1* | 8/2016 | Arvapally ............ | G06Q 30/016 |
| 2018/0357302 A1 | 12/2018 | Qi et al. | |
| 2020/0242623 A1 | 7/2020 | Savir et al. | |
| 2020/0380074 A1* | 12/2020 | Li .......................... | G06N 20/00 |
| 2021/0241313 A1* | 8/2021 | Wang ............... | G06F 16/90344 |
| 2022/0230089 A1* | 7/2022 | Peraud ................... | G06N 20/00 |
| 2023/0095935 A1* | 3/2023 | Robert Jose ........... | G06F 16/45 |
| | | | 707/738 |
| 2024/0273289 A1* | 8/2024 | Li ....................... | G06F 16/3322 |

OTHER PUBLICATIONS

Wolff, Rachel, "Harnessing NLP for Customer Feedback Analysis", Retrieved from: https://monkeylearn.com/blog/nlp-feedback/, Jun. 23, 2021, 12 Pages.

* cited by examiner

300B

Periods p-0  p-1  p-2  p-3  p-4  p-5  p-6  p-7

Trending Topics in Feedbacks

Trending Topics: 24      Number of Customer Inquiries: 3857

| Trending keyword | Sample Inquiry Comment | Cluster Size | Average Comment Size |
|---|---|---|---|
| Email | Too slow | 94 | 26 |
| Sign in | Not user friendly | 73 | 12 |
| Insert table | Makes my computer crash | 68 | 60 |

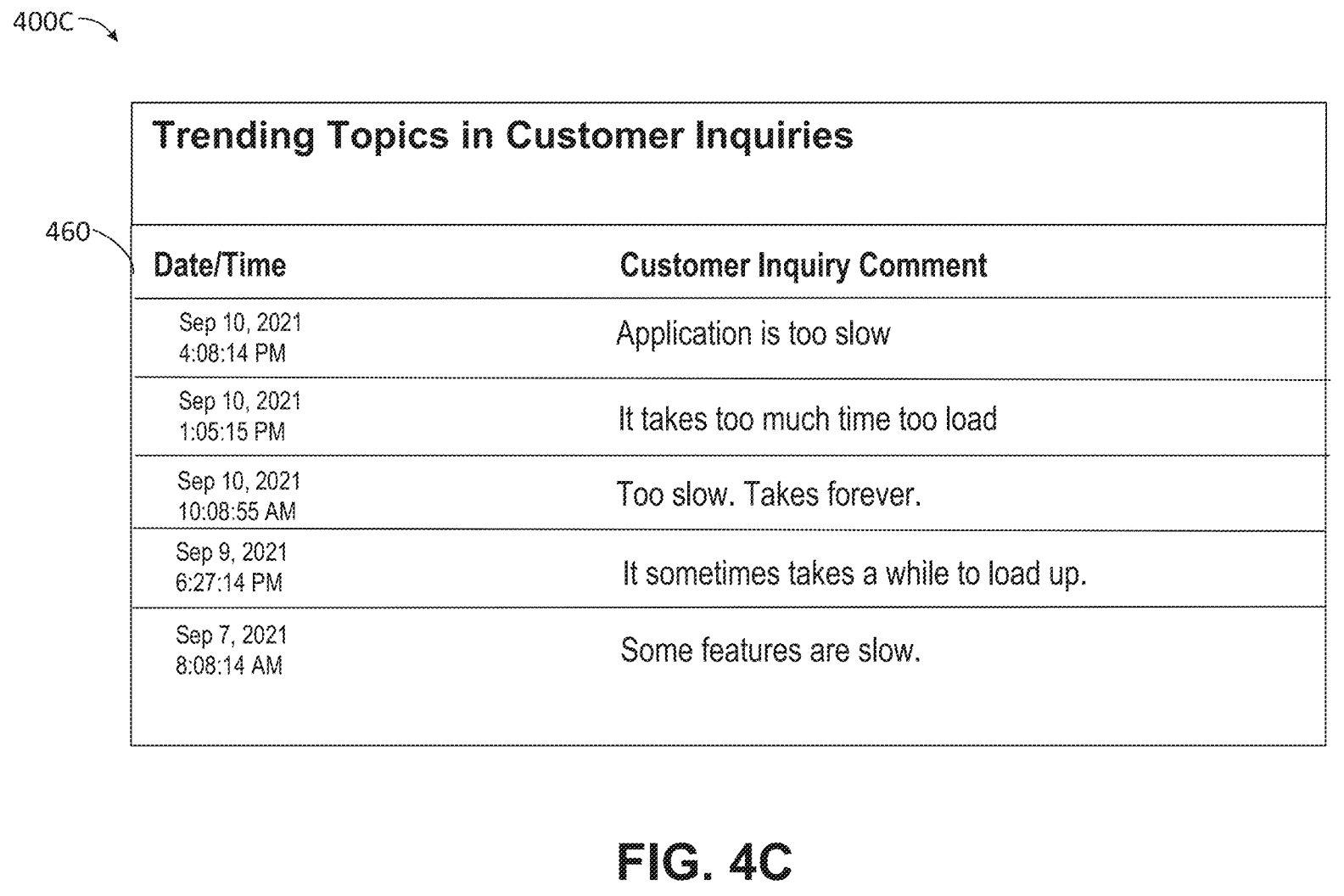

Trending Topics in Customer Inquiries

| Date/Time | Customer Inquiry Comment |
|---|---|
| Sep 10, 2021 4:08:14 PM | Application is too slow |
| Sep 10, 2021 1:05:15 PM | It takes too much time too load |
| Sep 10, 2021 10:08:55 AM | Too slow. Takes forever. |
| Sep 9, 2021 6:27:14 PM | It sometimes takes a while to load up. |
| Sep 7, 2021 8:08:14 AM | Some features are slow. |

FIG. 4C

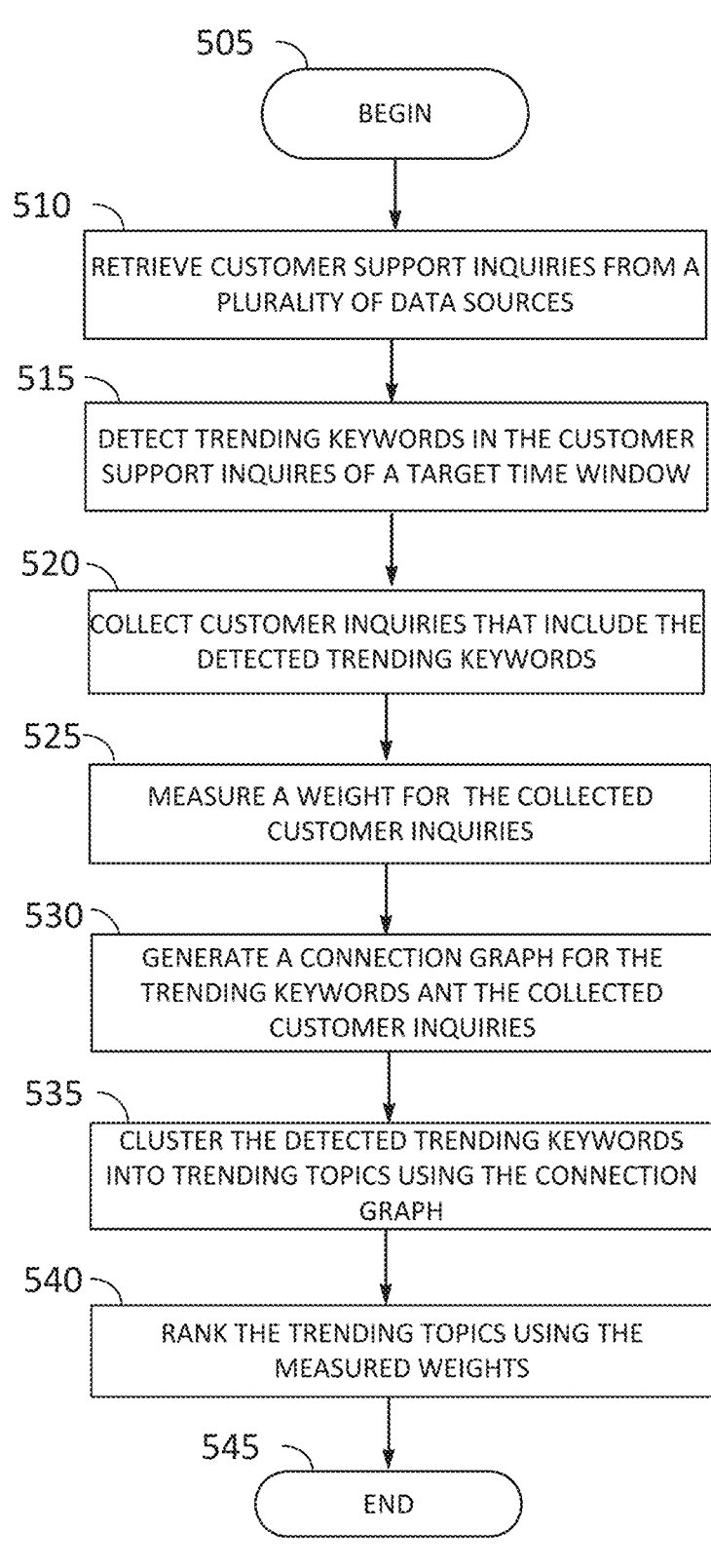

500

505 — BEGIN

510 — RETRIEVE CUSTOMER SUPPORT INQUIRIES FROM A PLURALITY OF DATA SOURCES

515 — DETECT TRENDING KEYWORDS IN THE CUSTOMER SUPPORT INQUIRES OF A TARGET TIME WINDOW

520 — COLLECT CUSTOMER INQUIRIES THAT INCLUDE THE DETECTED TRENDING KEYWORDS

525 — MEASURE A WEIGHT FOR THE COLLECTED CUSTOMER INQUIRIES

530 — GENERATE A CONNECTION GRAPH FOR THE TRENDING KEYWORDS ANT THE COLLECTED CUSTOMER INQUIRIES

535 — CLUSTER THE DETECTED TRENDING KEYWORDS INTO TRENDING TOPICS USING THE CONNECTION GRAPH

540 — RANK THE TRENDING TOPICS USING THE MEASURED WEIGHTS

545 — END

FIG. 5

METHOD AND SYSTEM FOR IDENTIFYING TRENDING TOPICS IN CUSTOMER INQUIRIES

BACKGROUND

Enterprises often receive user inquiries from customer that desire to report an issue or seek help in using a product or service. Entities that provide computing systems, software programs and/or software services often receive real-time user feedback in the form of incident reports and customer support inquiries. For example, many software providers receive incident reports or customer inquiries when the users encounter problems using a software feature or application. Incident reports and customer inquiries often include textual content such as written comments. Large enterprises often receive numerous incident reports and customer inquiries on a given day. This is particularly the case for companies that have many products or services and/or a large user population. Reviewing and analyzing this written feedback requires substantial time and effort. When significant numbers of comments are received frequently, reviewing each comment individually becomes time prohibitive. Furthermore, even if employees are assigned to the task of reviewing comments individually, categorizing the comments into specific categories and determining which categories have received more comments can be a very complex task.

Identifying new or trending topics in user inquiries is important in timely identification and troubleshooting of computing system and/or software errors. However, reviewing numerous written comments received to identify new trending topics is a very complicated undertaking. Moreover, current mechanisms for performing this function require a significant amount of time and computing resources to achieve this.

Hence, there is a need for improved systems and methods of enabling review and analysis of customer inquiries.

SUMMARY

In one general aspect, the instant disclosure presents a data processing system having a processor and a memory in communication with the processor wherein the memory stores executable instructions that, when executed by the processor, cause the data processing system to perform multiple functions. The functions include retrieving customer inquiries from a plurality of data sources for a target time window and for one or more reference time windows; detecting trending keywords in the target time window by comparing frequency of keywords in the target time window with a frequency of keywords in the one or more reference time windows; responsive to detecting the trending keywords, collecting customer inquiries in the target time window that include one or more of the trending keywords; generating a connection graph for the detected trending keywords and the collected customer inquiries, the connection graph showing a connection between a detected trending keyword and each collected customer inquiry that includes the detected trending keyword; clustering the detected trending keywords into a plurality of trending topics based on the connection graph; and providing notification data for alerting a user of the trending topics.

In yet another general aspect, the instant disclosure presents a method for detecting trending topics in customer inquiries. In some implementations, the method includes retrieving customer inquiries from a plurality of data sources for a target time window and for one or more reference time windows; detecting trending keywords in the target time window as compared to keywords in the one or more reference time windows; responsive to detecting the trending keywords, collecting customer inquiries in the target time window that include one or more of the trending keywords; measuring a weight for each collected customer inquiry based on weights of detected trending keywords in each collected customer inquiry; generating a connection graph for the detected trending keywords and the collected customer inquiries, the connection graph showing a connection between a detected trending keyword and each collected customer inquiry that includes the detected trending keyword; clustering the detected trending keywords into a plurality of trending topics based on the connection graph; and ranking the trending topics based on the measured weights of the collected customer inquiries associated with each trending topic.

In a further general aspect, the instant application describes a non-transitory computer readable medium on which are stored instructions that when executed cause a programmable device to perform functions of retrieving customer inquiries from a plurality of data sources for a target time window and for one or more reference time windows; detecting trending keywords in the target time window by comparing frequency of keywords in the target time window with a frequency of keywords in the one or more reference time windows; responsive to detecting the trending keywords, collecting customer inquiries in the target time window that include one or more of the trending keywords; generating a connection graph for the detected trending keywords and the collected customer inquiries, the connection graph showing a connection between a detected trending keyword and each collected customer inquiry that includes the detected trending keyword; clustering the detected trending keywords into a plurality of trending topics based on the connection graph; and providing notification data for alerting a user of the trending topics.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4C depict example graphical user interface (GUI) screens of an application or service that offers review and analysis of customer inquiries.

FIG. 5 is a flow diagram depicting an example method for detecting trending topics in customer inquiries for an entity.

DETAILED DESCRIPTION

Figure 1:
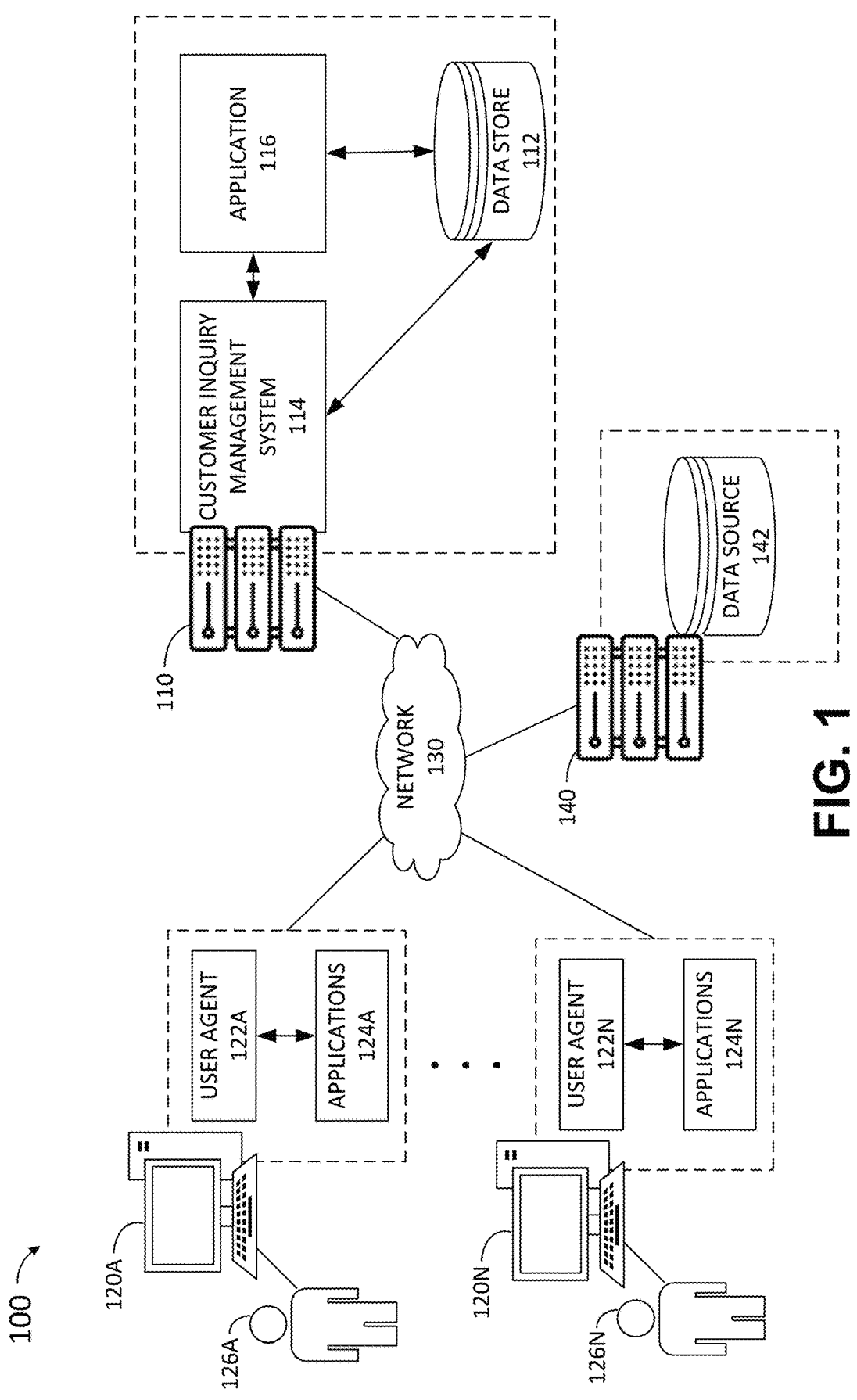
FIG. 1 depicts an example system upon which aspects of this disclosure may be implemented.

Many enterprises offer customer support avenues for receiving feedback from their customers. These customer support avenues often include customer support channels that enable users to provide textual data relating to the product or services they are using. The customer support feedback may include but is not limited to feedback on customer experiences related to products, services and/or business operations, requests for technical support, and reports of incidents or service outages, among others. Timely detection of these inquiries and incident topics assumes an increasingly important role in customer-centric businesses. This is particularly importance for enterprises that offer computing devices and/or services as it is important for computing devices and services to provide uninterrupted operations. Early detection of computing related incidents enables the engineering team to promptly address technical issues, mitigate service disruptions, and facilitate continuous service delivery. Furthermore, early detection of new issues helps optimize support costs, as a swift service recovery minimizes the number of support requests and complaints from affected customers, thereby reducing expenses associated with engaging third-party agencies or full-time employees for support services. Moreover, early detection of computing incidents improves computer functionality.

Customer inquiries and questions that come through different customer support channels provide a rich source of textual data to understand computing and/or software issues and gain more insights into customer support needs with respect to these types of products and services. By analyzing this textual data, an entity can detect increases in customer support inquiries and/or increases in specific topics in support inquiries, which represent elevated volumes of queries during specific time periods. Such increases enables entities to pinpoint different product issues, regressions in software, and the like and can be used to timely alert the teams (e.g., engineering teams responsible for the given products). The inquiries in these increased topics can also provide the engineering teams with different symptoms and scenarios under which customers are facing this issue and can help in resolving the issue quicker. Thus, by analyzing the customer support channels, an entity can identify new trending topics. The term "trending topic" as used in this disclosure refers to topics in customer support inquiries that are either entirely new topics that have not been previously observed or are existing topics that are experiencing a surge in volume that surpasses a historical average.

Customer support inquiries typically include a short textual segment that is typically in the range of 3 to 20 words or phrases and briefly states the issue faced by the customer. In an example, the text is a copy and paste of the error message the customer received when they were trying to use a product and/or service. Identifying an increase in the overall volumes of customer support inquiries in a given time period (e.g., the last 24 hours) can be done by comparing the total inquiry volume for the current time period against the past volumes for the same time period (e.g., same weekday the previous weeks). However, unless the increase in volume is significant, it can go unnoticed when the overall volumes are only partially high. Moreover, detecting an overall increase does not provide enough information for troubleshooting issues. In order to address the increase, an entity would need to identify the issue responsible for the increase in volume. This can be done by analyzing the text of the customer support inquiries using natural language processing (NLP) to identify the common terms that describe the issue or incident.

Traditional anomaly detection methods for customer queries rely on predefined topics or scenarios, categorizing incoming inquiries and monitoring trends based on these predetermined categories. However, the granularity of these predefined topics is often insufficient, resulting in the grouping of multiple distinct topics into one topic. Furthermore, detecting the factors that contribute to an increase in volume of a particular topic is challenging in previously used mechanisms. Additionally, traditional anomaly detection mechanisms are not adapted to detecting previously non-existent topics. This limits the effectiveness of traditional approaches in real-world operational scenarios. Thus, there exists a technical problem of lack of mechanisms for identifying trending topics in customer feedback such as customer support inquiries. This results in inefficient mechanisms for addressing computer systems and/or software malfunctions.

To address these technical problems and more, in an example, this description provides technical solutions for identifying trending topics in customer support inquiries without using conventional unsupervised machine-learning mechanisms. This involves the use of keywords to represent new trending topics in customer support inquires and to conduct a graph search process to group the customer support inquires through graph links and analyzing edges between items in the graph. In an example, this involves optimizing data ingestion from diverse sources of customer support data, converting the data to a standardized schema for storage, and detecting new trending topics with an increase in volume in real-time. Detecting of new trending topics involves use of NLP, statistical inferences, and/or graph search methodologies that analyze non-structured text data to identify keywords that are associated with trending topics. Once the keywords are identified, customer support inquires which have at least one of the keywords are collected and grouped within the target group that utilize any of the trending keywords. A graph search process is then conducted to group the retained queries into distinct clusters, before generating and sending alerts for the identified clusters.

In some implementations, the technical solution offers a text-based anomaly detection system that leverages cloud-based data ingestion, data storage, and computational tools to seamlessly orchestrate data input, anomaly detection, insight preservation, and alert generation processes. A data ingestion component may be used that is optimized to perform data streaming, extraction, transformation, and/or preservation tasks. This data ingestion component offers the capability to easily scale out for ingesting data from diverse sources, reducing heterogeneity among various sources and storing them in a data store with a standardized schema. The subsequent tasks of detecting new trending topics and providing alerts may operate autonomously by being independent of the specific data sources employed.

A detection component used, in some implementations, utilizes natural language processing, statistical inferences, and/or graph search methodologies to analyze non-structured text data to detect increases in specific topics. The detection component detects topics with a surge in volume in near real-time. Moreover, the detection component may retain queries associated with the detected topics as evidence of potential service incidents.

In some implementations, the detection process begins by identifying keywords that may be associated with detected topics. To accomplish this, the detection component retrieves the most recent inquiries, which can be configured based on specific requirements. These inquiries serve as the target of interest, alongside inquiries from corresponding time windows on the same weekdays from previous time windows, which serve as the reference. The occurrence of keywords across all inquiries from the target and reference groups is recorded, and statistical measures such as average and standard deviation are computed for the counts of individual keywords within the reference groups. These statistics are then utilized to establish an anomaly detection threshold. By comparing the number of keywords from the target groups with the corresponding thresholds, keywords exceeding the thresholds are identified as trending keywords. These trending keywords may represent new trending topics individually or, may represent a part of a new trending topic (as most topics typically include multiple keywords used concurrently, often in the form of single or multiple entities (nouns) combined with actions (verbs)).

Once the trending keywords are identified, inquiries within the target group that utilize a trending keyword are collected. Subsequently, a graph search process is performed to group the collected inquiries into distinct clusters. In some implementations, the collected inquiries and trending keywords serve as two different types of nodes in building connection graphs. With a depth-first search algorithm, the process initiates with a trending keyword node and establishes directed connections (graph links or edges) between this keyword and all the collected inquiries mentioning it. If a query mentions a new trending keyword, it establishes a connection with this new keyword node. The search is continued for inquiries referencing the new keyword and generating the graph in this manner. As a result, nodes representing the collected inquiries and trending keywords gradually form a few disconnected graphs. Inquiries from different graphs do not overlap, indicating that they represent distinct topics.

Once the graphs are generated, the system generates distinct clusters of collected inquiries, each characterized by the presence of trending keywords that represent new trending topics. These clusters are stored in a database and can made available to a user associated with the entity (e.g., customer support team member or engineering team) using various means of consumption (e.g., email notifications or rendered HTML pages accessible via a web portal). The system offers configurability to identify new trending topics both at a global and regional level. This provides a technical advantage with respect to certain topics that exhibit increased exclusively within specific subgroups of the text corpus, where the historical baseline is comparatively low.

Conversely, these same topics may not experience significant increases in volume within the broader context of the entire text corpus, where the historical reference is higher.

In this manner, the technical solution described herein addresses the technical problem of lack of mechanisms for accurately and efficiently identifying new trending topics in customer support inquiries. The technical solution utilizes a system that accurately detects new trending topics and provides a notification for issues that likely need troubleshooting in near real time. The technical effects at least include (1) improving the operation of computing systems and software programs by efficiency identifying issues that require attention; (2) improving accuracy and efficiency of anomaly detection in customer support inquiries; and (3) providing user interface (UI) elements that enable a user to efficiently review customer support inquiries that may require attention.

As will be understood by persons of skill in the art upon reading this disclosure, benefits and advantages provided by such implementations can include, but are not limited to, improved performance of computing systems, improved performance of anomaly detection systems (e.g., time-efficiency) and improved detection resolution (e.g., content topic specificity). The benefits made available by these technology-based solutions provide enhanced time efficiency for near real-time detection. Unlike conventional approaches that use unsupervised machine learning algorithms such as hierarchical clustering to cluster input text based on query similarities, the technical solutions provided in this disclosure offer time efficiency by employing iterative processes that operate with a one pass approach. This eliminates the need for computing pairwise similarities between inquiries, resulting in a linear relationship with the size of the input text. This time-efficient feature not only saves computational resources and time but also makes it possible to launch the detection process every few minutes, allowing for near-real-time detection with minimal delay in processing the latest data from the text sources. Improved detection resolution for dynamic topics is provided by operating at a keyword level to detect existing and previously unseen incidents. By starting at the most granular unit of language (individual words), the technical solution captures incidents that utilize both common and uncommon features, providing comprehensive coverage and accurate detection.

As used herein, the terms "feedback," "customer feedback", "inquiries" or "customer support inquiries" may refer to any spoken or written comments received from users of products and/or services relating to the products and/or services offered by an entity. This includes customer support inquiries such as inquiries received from customer support channels that enable users to submit requests for help with a product or service. It also includes incident reports that provide notification of an incident occurring with respect to a product or service. It may also include comments received that simply provide feedback on a product or service.

FIG. 1 illustrates an example system 100, upon which aspects of this disclosure may be implemented. The system 100 includes a server 110 which is connected to or includes a customer inquiry management system 114, a data store 112, and an application 116. The server 110 may include a plurality of servers that work together to deliver the functions and services provided by each service or application. The server 110 may operate as a cloud-based server for offering customer inquiry management services. The services offered by the customer inquiry management system 114 may be offered in one or more applications such as application 116 and/or applications 124. In some implementations, server 110 operates as a shared resource server located at an enterprise accessible by various computer client devices such as one or more of the client devices 120A-120N (referred to collectively as client device 120).

The customer inquiry management system 114 provides processing of customer inquiries in real-time to identify new trending topics in the customer inquiries. The customer inquiry management system 114 retrieves data from one or more customer inquiry data sources such as the data source 142, preprocesses the received data, utilizes NLP statistical inferences, and/or graph search mechanisms to analyze text data of the customer inquiry to identify keywords that are associated with new trending topics. The customer inquiry management system 114 then collects customer inquiries which have at least one of the identified keywords before performing a graph search process to group the retained customer inquiries into distinct clusters. Based on these clusters, the customer inquiry management system 114 generates and transmits notifications for the identified new trending topics. The notifications may be provided to users via the application 116 or applications 124. Various elements of the customer inquiry management system 114 are discussed in more detail with respect to FIG. 2.

The data store 112 functions as a repository in which the retrieved customer inquiries, customer inquiry graph data, customer inquiry clustering data, historical customer inquiry data used for comparison, and the like may be stored. Although shown as a single data store, the data store 112 may be representative of multiple storage devices and data stores which may be connected to each of the various elements of the system 100. Furthermore, although the data store 112 is shown as being part of the server 110, one or more elements (e.g., storage mediums) of the data store 112 may be provided in separate storage servers or other types of servers.

Each of the client devices 120A-120N may be connected to the server 110 via a network 130. The network 130 may be a wired or wireless network(s) or a combination of wired and wireless networks that connect one or more elements of the system 100. The client devices 120A-120N may be personal or handheld computing device having or being connected to input/output elements that enable a user to interact with various applications (e.g., application 116 or applications 124A-124N). Examples of suitable client devices 120A-120N include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail in regard to FIGS. 6 and 7.

Each of the client devices 120A-120N may be associated with a different user such as users 126A-126N (referred to collectively as user 126). In some implementations, a client device 120 is associated with user 126 who may be an engineer or IT administrator that is responsible for addressing one or more types of incident reports, system outages, customer support inquires and the like. The user 126 may utilize an application such as online application 116 or local applications 124 to review customer feedback such as incident reports and customer support inquiries. In some implementations, notifications of new trending topics are automatically provided to the user 126 via the online application 116 or local applications 124. For example, the online application 116 or local applications 124 may provide a user interface screen (e.g., a portal) that displays notifications regarding new trending topics in customer inquiries.

The application 124 also represent applications used by users for submitting user feedback. For example, applications 124 and/or application 116 may be any application that provides a customer support channel via which the user can provide a customer inquiry. Such customer inquiry may be transmitted directly to the customer inquiry management system 114 and/or to another customer inquiry management service for storage and processing. In an example, data from various types of applications such as applications 124 and 116 are collected and stored in the same or different data sources 142, for future access and/or processing. Applications 124A-124N are native applications that provide customer inquiry review and/or management features and/or offer customer support channels for submitting customer feedback. Application 116 represent similar applications that are executed on the server 110 (and are provided via an online service. In some implementations, web applications communicate via the network 130 with a user agent 122A-122N, such as a browser, executing on the client device 120A-120N. The user agent 122A-122N may provide a UI that allows the user to interact with application 116 and may enable application 116 to provide data to or receive data from the customer inquiry management system 114.

The storage server 140 stores one or more data sources 142 for storing customer inquiries. In some implementations, customer inquiries received from different applications/products are stored in different data stores and/or data structures. Furthermore, customer inquiry data may be stored in different data sources or data stores based on the customer support channel from which it was received. For example, customer support inquiries received via in-application help features may be stored in a separate database than those received via email or chat.

Figure 2:
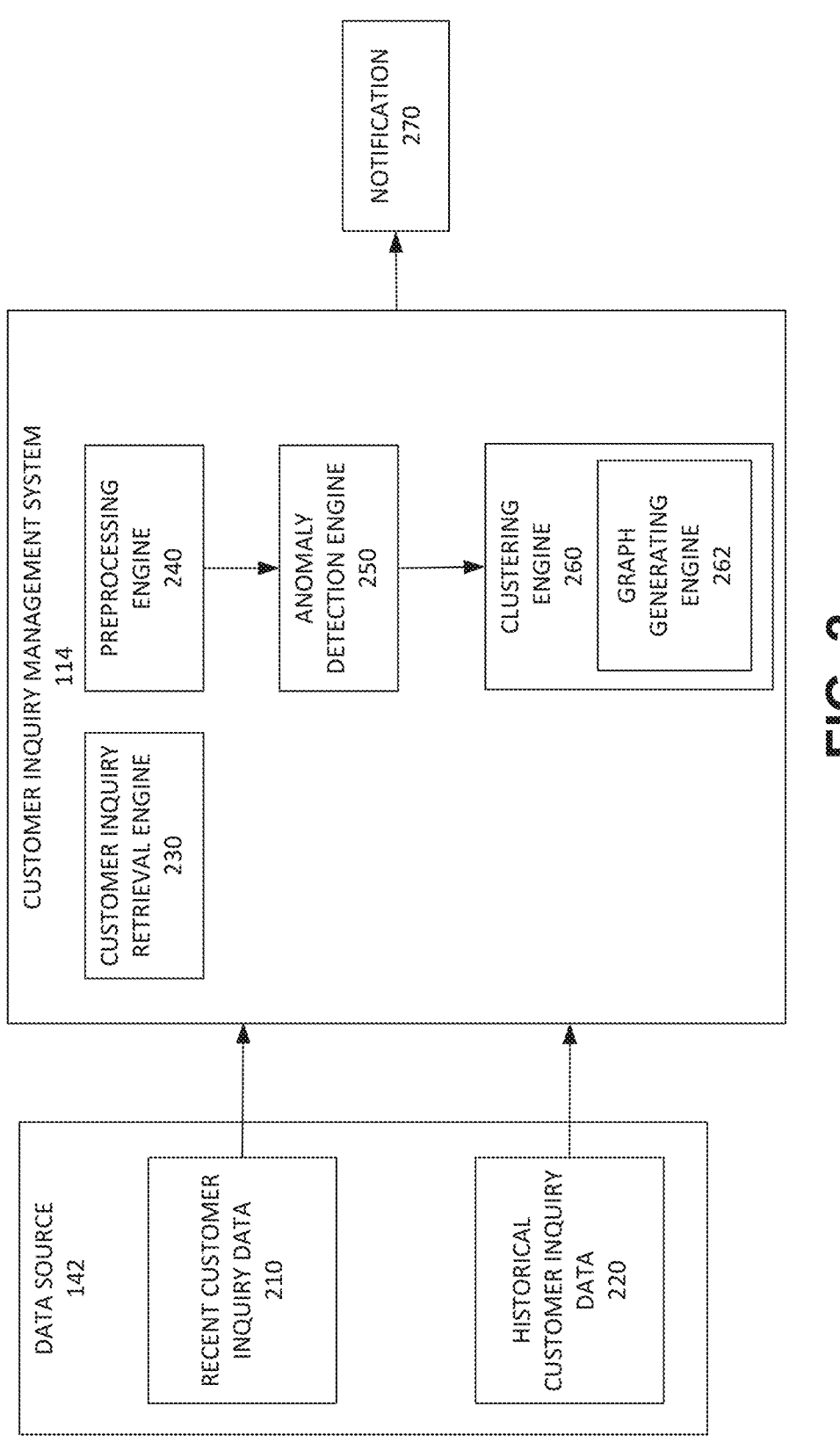
FIG. 2 depicts some elements involved in identifying new trending topics in customer inquiries.

FIG. 2 depicts some elements involved in identifying new trending topics in customer inquiries. In some implementations, the customer inquiry management system 114 retrieves recent customer inquiry data 210 and historical customer inquiry data 220 from the data source 142 for processing. The recent customer inquiry data 210 and historical customer inquiry data 220 data are retrieved from data storage mediums that store customer inquiry data such as the data source 142. In some implementations, prior to retrieving the recent customer inquiry data 210 and/or historical customer inquiry data 220, some of the data is converted to a new schema to ensure all the data has the same schema. This is because data received via different customer support channels, in relation to different products and/or associated with a specific entity may have different formats and may be stored in a variety of schema. For example, some enterprises store incident reports and/or customer support inquiries in specific schemas that are different from the standard schema used by the customer inquiry management system 114. These types of data is converted to the standard schema, in some implementations. Normalizing the data ensures that all the retrieved data is in the same standard schema so it can be compared/processed more efficiently. Recent customer inquiry data refers to customer inquiry data that was received within a most recent time period (e.g., the last 24 hours, the last 12 hours, and the like). The recent customer inquiry data may be retrieved by utilizing the customer inquiry retrieval engine 230.

In some implementations, the customer inquiry retrieval engine 230 retrieves the recent customer inquiry data 210 by using a moving time window of a given time length (e.g., 24 hours, 12 hours, etc.). The given time length may be predetermined or may be modifiable by a user or administrator based on the needs of an organization. The given time length determines the time period for which new trending topics are identified. Thus, when the given time length is 24 hours, the customer inquiry management system 114 identifies new trending topics in customer inquiries received within the last 24 hours. This time window may be referred to as the target time window.

In addition to receiving the recent customer inquiry data 210, the customer inquiry retrieval engine 230 also retrieves historical customer inquiry data 220 in order to compare the recent customer inquiry data 210 against the historical customer inquiry data to identify new trending topics. In order to achieve this, the customer inquiry retrieval engine 230 retrieves historical customer inquiry data 220 that corresponds with the retrieved recent customer inquiry data 210 but is from a prior period than the target time window (e.g., from 24-hour periods that occurred prior to the last 24 hours). In an example, this includes customer inquiry data from the same time period as the target time window (e.g., 24 hours or 12 hours) but from one to eight weeks prior to the recent time window (e.g., 8 previous 24 hours). The previous time periods may be referred to as reference time windows. In some implementations, in addition to the time window, day of the week is taken into account. For example, if the recent customer inquiry data is from the prior 24 hours which was a Monday, the historical customer inquiry data 220 is data from the previous Mondays (e.g., 1 to 8 prior Mondays).

Figure 3A:
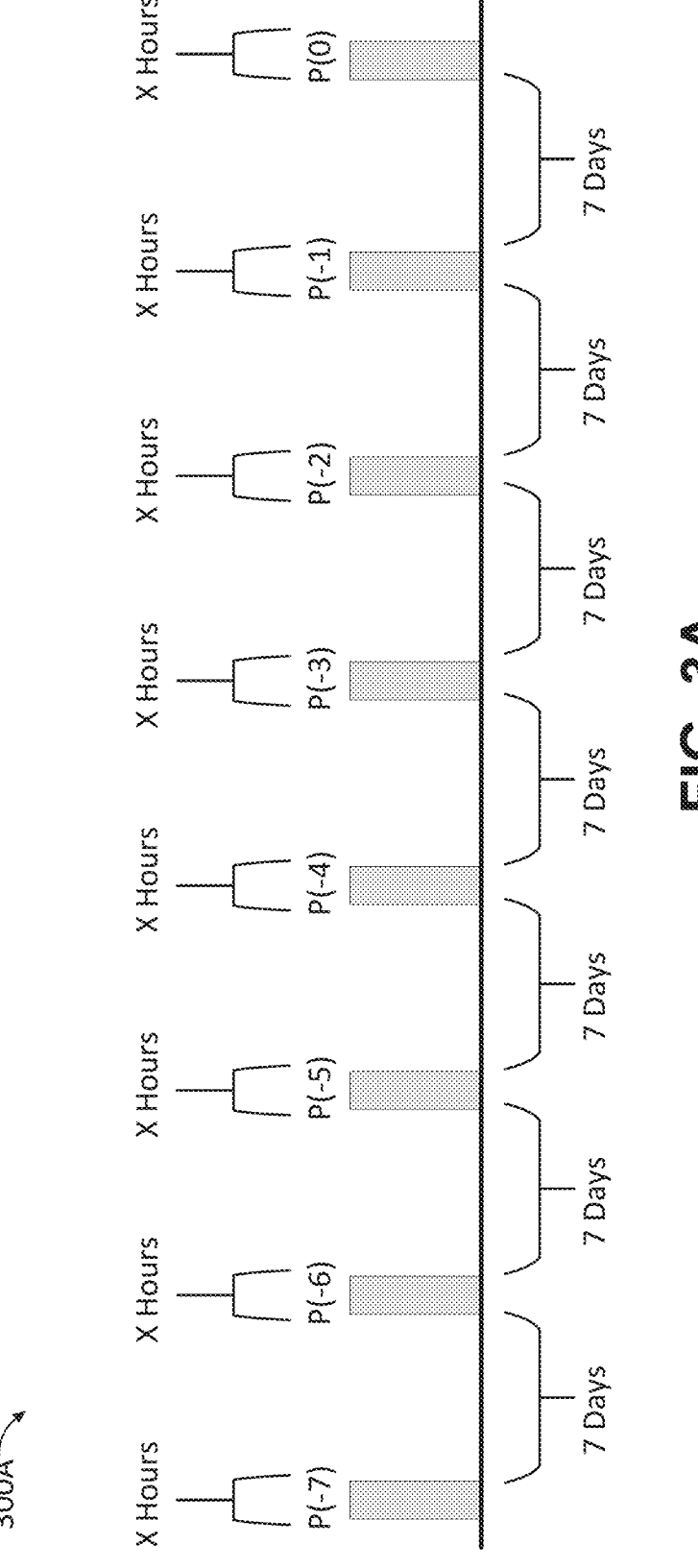
FIG. 3A depicts an example timeline for a target time window and reference time windows.

FIG. 3A depicts an example timeline 300A for the target time window and reference time windows. As depicted, the target time window may be denoted by P(0), in which case, the reference time windows may be denoted by P(-1), P(-2), P(-3) to P(-7). The duration of each of the time windows is the same for the target time window and the reference time windows (e.g., x hours). Thus, time windows are used to retrieve historical customer inquiry data that is likely to show the same patterns as the target time window.

Referring back to FIG. 2, in some implementations, in retrieving the historical customer inquiry data 220, care is taken to retrieve customer inquiry data from data sources that are similar to the data source from which the recent customer inquiry data 210 was retrieved (e.g., customer inquiry data from the same application/product, same customer support channel, etc.). In this manner, the historical customer inquiry data 220 provides a reference point from previous time periods against which the customer inquiry data from the current time period can be compared to identify trending topics.

Once the recent customer inquiry data 210 and historical customer inquiry data 220 have been retrieved, the customer inquiry management system 114 utilizes a preprocessing engine 240 to preprocess the data. In some implementations, the preprocessing engine 240 preprocesses the data by removing non-alphanumerical characters and by stemming. In some implementations, the processes of data retrieval and preprocessing are performed by a data ingestion engine that is designed and optimized to perform data streaming, extraction, transformation, and/or preservation. The data ingestion engine and/or the customer inquiry retrieval engine 230 and preprocessing engine 240 possess the capability to easily scale out for ingesting data from diverse data sources and reducing heterogeneity among various customer inquiry data. In some implementations, the preprocessed data is stored in a data store such as the data store 112 of FIG. 1, with a standardized schema. As a result of this preprocessing, subsequent tasks of detecting new trending topics and providing notifications can operate autonomously and independent of the specific data sources employed.

Once the data is preprocessed, the customer inquiry management system 114 utilizes the anomaly detection engine 250 to detect new trending topics. In some implementations, this involves examining one or more keywords (e.g., words or phrases) in a customer inquiry dictionary and determining if each keyword is trending by comparing the number of times the keyword appears in the target time window as compared to the number of times it appears in the reference time windows. The keyword dictionary may include unigrams, bi-grams and/or few common phrases extracted from a corpus of historical customer inquiry data. In an example, $w_k$ is used to denote a keyword in the dictionary, while Nc is used to denote the total number of customer inquiries in the current time window and N' is used to denote the total number of customer inquiries in the reference time window. The total number of customer inquiries from the target window Tc containing the keyword $w_k$ can then be calculated using the following equation.

$$Nc_k = \sum_{j=1}^{Nc} 1 \text{ if } qj \text{ has the word } w_k \text{ else } 0 \qquad (1)$$

The total number of individual customer inquiries from the reference time window T'containing the keyword $w_k$ can be calculated using equation (2).

$$N'_k = \sum_{j=1}^{N'} 1 \text{ if } qj \text{ has the word } w_k \text{ else } 0 \qquad (2)$$

In some implementations, the anomaly detection engine 250 normalizes the total numbers to get the fractions for each keyword. These fractions represent the probability that any given customer inquiry has that particular keyword during that time. This is represented by equation 3, which is displayed below.

$$fc_k = \frac{Nc_k}{Nc} \text{ and } f'_k = \frac{N'_k}{N'} \qquad (3)$$

To determine if a keyword is trending, the anomaly detection engine 250 performs a two-sample proportion test to check if $fc_k$ is statistically significantly different from $f'_k$ of the reference time window (e.g., two tailed with 99% a). When the probability of the customer inquiry from the target time window including a keyword is statistically significantly greater than the probability of the keyword being present in customer inquiry of the reference time window, the keyword may be identified as a trending keyword. Thus, the anomaly detection engine 250 utilizes statistical measurements to identify new trending keywords.

Figure 3B:
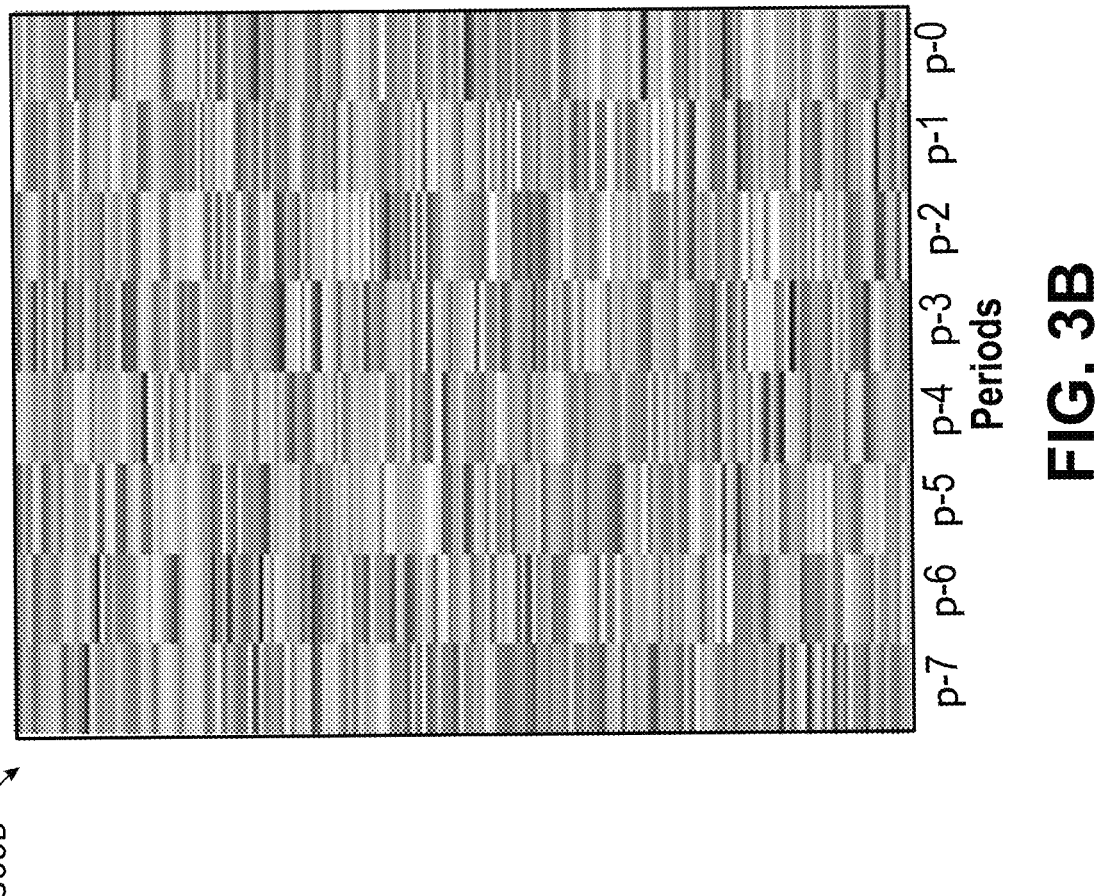
FIG. 3B depicts a heatmap for keywords detected in customer inquiries received during a target time window as compared to keywords detected in customer inquiries received during reference time windows.

FIG. 3B depicts a heatmap 300B for keywords detected in customer inquiries received during a target time window P-0 as compared to keywords detected in customer inquiries received during reference time windows P-1 through P-7. In the heatmap 300B, darker colors represent more frequency of a keyword, while lighter colors represent lower frequency. Keywords associated with colors that appear darker or much darker in the target time window than in the reference time windows can be identified as trending keywords, since the frequency of such keywords in the target time window is higher or significantly higher than their frequency in the reference time windows. Thus, in some implementations, heatmaps can be used to detect trending keywords.

Figure 3C:
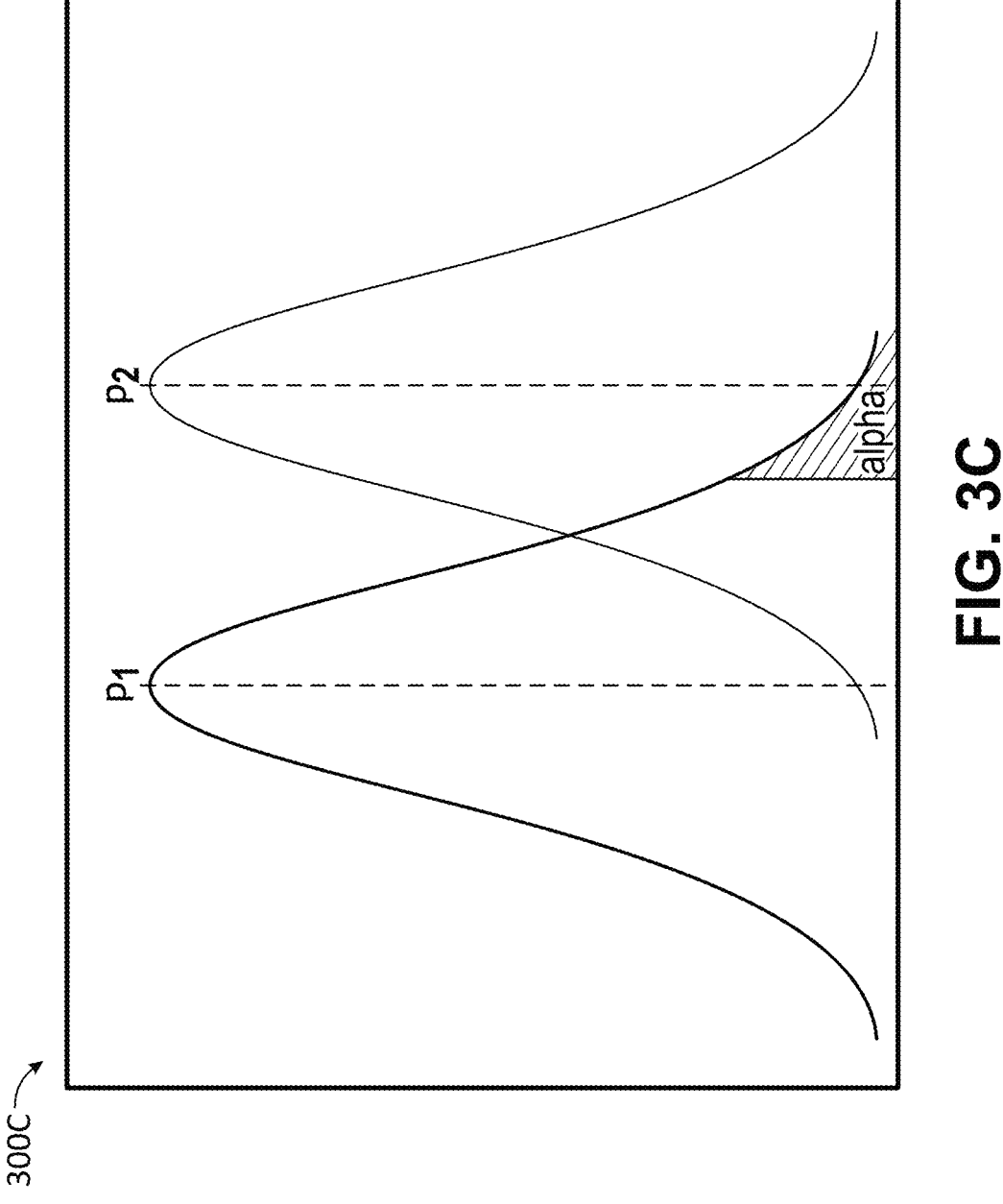
FIG. 3C depicts an example of statistical distribution of frequency of a keyword during two time periods.

FIG. 3C depicts an example graph 300C of statistical calculations for frequency of a keyword during two time periods. With the target time window being denoted as $P_2$ and the reference time window being denoted as $P_1$, graph 300C depicts z-score and p values for a trending keyword. Thus, graph 300C depicts an example 2-tailed z test to compare keyword frequency between the reference time period and the target time period. The area denoted alpha in the graph 300C is the area under the probability distribution curve which helps determine whether a difference is statistically significantly different. Denoting $n_1$ as the total number customer inquiry counts in the reference time window, denoting $n_2$ as the total number of customer inquiry counts in the target time window, $f_1$ as the keyword count in the reference window for a specific keyword and $f_2$ as the keyword count for the specific keyword in the target time window, p values for the keyword in each time window can be calculated based on the following equations.

$$p_1 = \frac{f_1}{n_1} \tag{4}$$

$$p_2 = \frac{f_2}{n_2} \tag{5}$$

The overall frequency of the keyword is then calculated using equation (6).

$$p = \frac{p_1 \times n_1 + p_2 \times n_2}{n_1 + n_2} \tag{6}$$

The z score can then be calculated by first measuring SE as determined by equation (7) and then measuring the z score using the SE value.

$$SE = \sqrt{p \times (1 - p) \times \left(\frac{1}{n_1} + \frac{1}{n_2}\right)} \tag{7}$$

$$Z = \frac{p_1 - p_2}{SE} \tag{8}$$

The p value can then be determined using equation (9).

$$pValue = 1 - P(-Z \le x \le Z) \tag{9}$$

In some implementations, these values are used as weights for customer inquiries including the specific keyword in order to rank the customer inquiries, as further discussed below.

Referring back to FIG. 2, once trending keywords are identified, a degree by which a keyword is trending, or the importance of a trending keyword is measured by multiplying the p value of the statistical measurement by the logarithm of its inverse document frequency (idf), which gives greater value to those less frequent words than commonly used words by definition. Denoting the degree by which the keyword is trending as $S_k$, this value can be calculated using equation (10).

$$S_k = p \text{ value}(fc_k, Nc_k, f_k', Nc) + \log\left(\frac{Nc}{1 + Nc_k}\right) \tag{10}$$

This may be done to obtain a weight for keywords, which in spite of being less frequent are used more often to describe the issue when there is a spike in a topic. For example, when the customer inquiry received includes the following: "outlook throttled", "multiple users unable to sign into Outlook, Message pops up that says Throttled", "Outlook is saying throttled in what would normally be a login box", "we are having numerous users with Outlook giving a message that says 'Throttled'" and "when they click on the 'need password' button they get the 'Throttled' message again. Please advise", the word "throttle" gets more weight than the word "Outlook"—because "throttle" is less frequently used than "outlook" and hence has greater idf value than that of "outlook".

Once weights for each of the trending keywords are measured, the individual customer inquiries (e.g., each customer support inquiry) from the target time window which include one or more of the trending keywords are retrieved. A weight is then measured for each customer inquiry by combining the weights of the trending keywords in the individual customer inquiries. In an example, this is done by utilizing a Bernouli generative model for the customer inquiry, such that each trending keyword is counted only once. Denoting the degree by which a customer inquiry is trending as S (qi), this degree can be measured using equation (11).

$$S(qi) = \sum\nolimits_{k \in Spiking\ Words} S_k \text{ if } qi \text{ contains } w_k \text{ else } 0 \tag{11}$$

For many products and services, entities receive feedback regarding multiple issues in a given time period (e.g., any given day). Each of these issues are often associated with different terminology (e.g., different words). Thus, the different issues that are encountered in a given time period are associated with their own trending keywords. To enable a user to accurately identify and address new trending topics in customer inquiries, it is advantageous to separate the trending keywords into multiple groups, where each group is indicative of a different issue. This may be achieved by using a clustering algorithm.

The customer inquiry management system 114 utilizes the clustering engine 260 to cluster the trending keywords into separate clusters. In an example, this is done by clustering two keywords together if they co-occur together in many of the trending customer inquiries. A similarity matrix is thus calculated using the co-occurrence frequencies. Denoting the co-occurrence similarity matrix for keywords $w_k$ and $w_k$, as D ($w_k$, $w_1$), the similarity matrix may be calculated using equation (12).

$$D(w_k, w_l) = \sum\nolimits_{j=1}^{Nc} 1 \text{ if } qj \text{ contains } w_k \text{ and } w_l \text{ else } 0 \tag{12}$$

In some implementations, the clustering engine 260 utilizes the graph generating engine 262 to generate a graph of the trending keywords. The graph generating engine 262 uses co-occurrence similarity matrices to define the graph with the trending keywords, where each trending keyword is a node on the graph. When the co-occurrence frequency of two trending keywords is above a certain threshold, an edge is generated between the nodes corresponding to the trending keywords. Once the graph is generated, the clustering engine 260 identifies connected keywords in the graph. This can be achieved using a variety of known mechanisms. In some implementations, connected keywords are extracted by using a depth-first search (DFS) algorithm. The result generates a cluster for each of the connected keywords and the trending keywords that are present in the connected keywords are identified as being part of the cluster. The trending customer inquiries are then clustered via the clustering engine 260 by identifying the trending keywords inside each customer inquiry and assigning the customer inquiry to the corresponding cluster that contains the identified trending keywords.

Figure 3D:
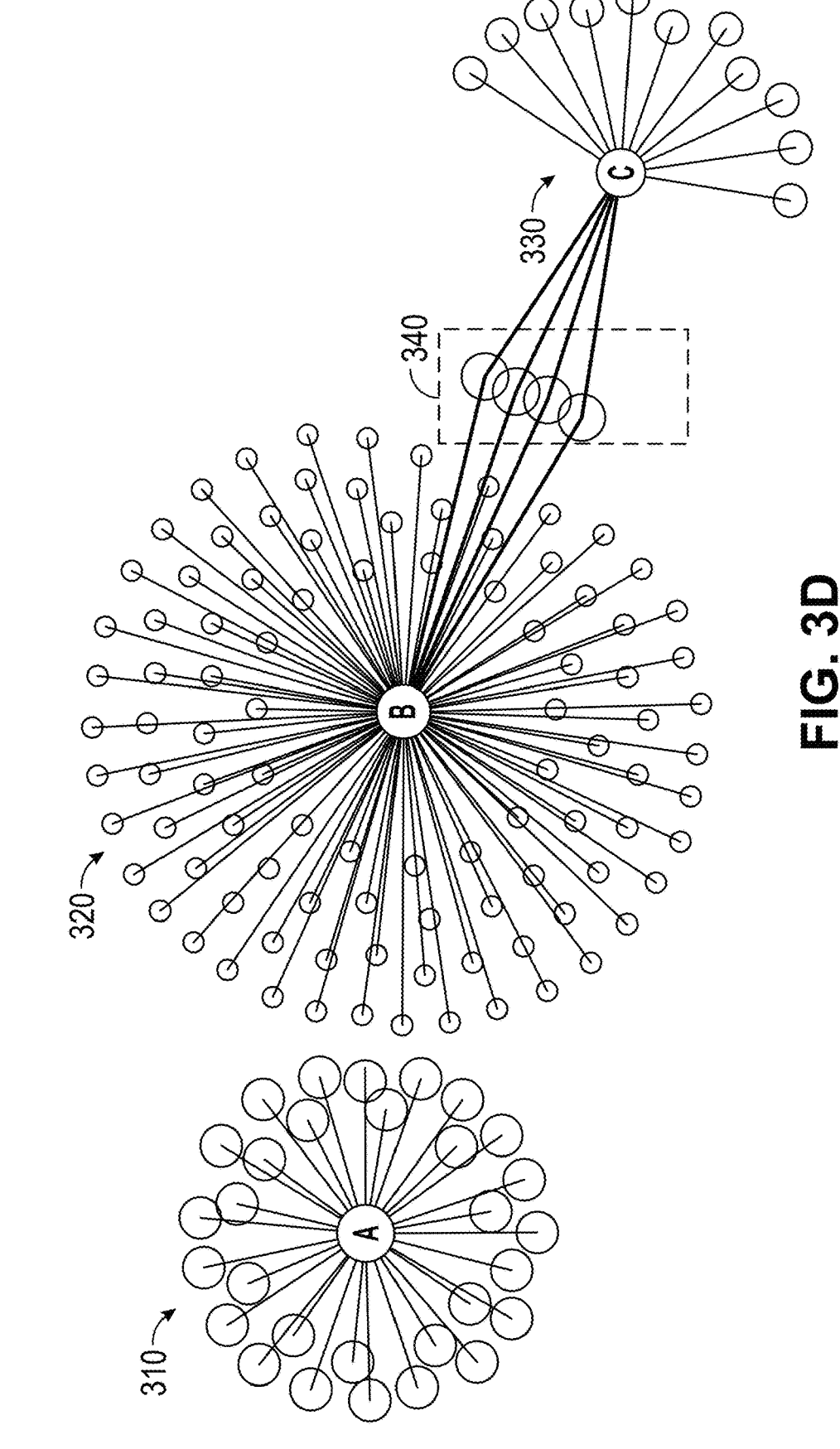
FIG. 3D depicts an example use of graphs for clustering keywords.

FIG. 3D depicts an example use of graphs for clustering keywords. Each of the letters A, B and C in FIG. 3D represent a keyword identified as being a trending keyword. As depicted, each keyword is illustrated using a node. The rest of smaller circles surrounding each keyword node are query nodes, representing the queries that include that keyword. This creates a cluster 310 of queries for the keyword A, a cluster 320 of queries for the letter B and a cluster 330 of queries for the letter C. However, a few queries exist that include both keywords B and C. These queries are grouped together into element 340. As a result, the keywords B and C are connected by edges (lines) that are connected to both nodes. This illustrates that the keywords B and C may be clustered together into one large cluster. This determination may be made depending on the number of edges and other parameters.

Once trending customer inquiry clusters are identified, the customer inquiry management system 114 provides the identified clusters via a notification 270 to a user or entity. This may be achieved by providing a list of the trending topics (e.g., trending keywords in each identified cluster) as well a list of individual customer inquiries from the target window for each trending topic. These individual customer inquiries may be sorted with respect to their weight such that customer inquiries having more trending keywords are displayed earlier in the list. In some implementations, clusters associated with increases in queries that are associated with any tickets and are thus not related to any incidents are removed or moved lower in the list such that topics that likely require more attention can be viewed first.

In some implementations, the customer inquiry management system 114 identifies new trending topics based on a predetermined schedule. For example, the customer inquiry management system 114 runs at predetermined time periods and analyzes data from the moving time window. In an example, this is done by running the process every 15 minutes, where the target time window at each run is the last 24 hours. In other implementations, the customer inquiry management system 114 performs the process of identifying new trending topics based on user request. For example, a user may submit a request to identify new trending topics for a specific time period (e.g., the last week), for a specific product and the like.

Figure 4A:
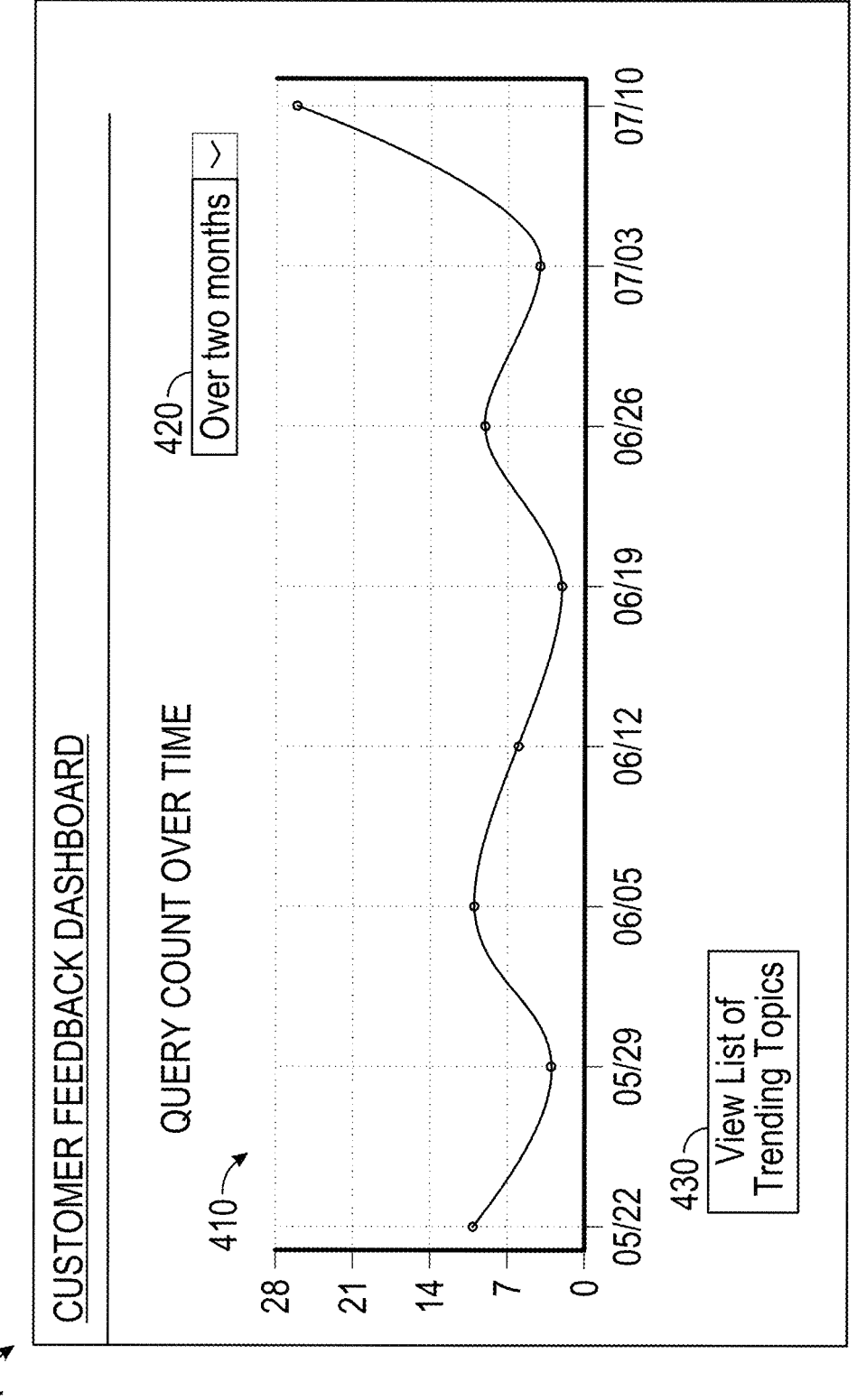

FIGS. 4A-4C depict example GUI screens of an application or service that offers review and analysis of customer inquiries. In some implementation, the GUI screen of the customer inquiry review and analysis application or service may include a plurality of UI menu options for selecting parameters for the customer inquiry the user is interested in reviewing. The UI options may include a UI element for selecting a source for the customer inquiry or a UI element for allowing the user to select the product for which customer inquiry is being reviewed. This may be useful for enterprises that offer multiple products and/or services.

In some implementations, selection of a specific product or customer inquiry source and choosing to view an overview of the inquiry counts for a trending topic over time results in the display of a GUI screen such as the GUI screen 400A of FIG. 4A. GUI screen 400A displays a customer feedback dashboard that presents a graph 410 depicting how the number of customer inquiries received has changed over time. The length of time for which the graph 410 is generated can be changed by using the menu option 420. For example, the length of time can be changed from two months, to one month or the last week. Graph 410 illustrates the volume of a detected trending topic in the current period (at the right-most of the chart) and the volume of this topic from previous periods.

To view a list of currently trending topics, the user can select the menu option 430. Upon selection of the menu option 430, a list of current trending topics for which clusters have been generated is displayed in a GUI screen such as the GUI screen 400B of FIG. 4B. The GUI screen 400B includes a trending topic information portion 440 for displaying information about the trending topics. The information may include the number of trending topics (e.g., cluster count) and the number of customer inquiry comments that are associated with the trending topics.

The GUI screen 400B also includes a trending topic portion 450, which may display a list of identified trending topics. The trending topic portion 450 includes a column of trending topics which display a list of trending keywords for the top trending clusters. For each trending topic name, the trending topic portion 450 may display a sample customer inquiry comment. The sample customer inquiry comment may be a randomly selected customer inquiry comment from the comments that form a given cluster. In some implementations, hovering over or otherwise selecting a sample customer inquiry comment results in display of a pop-up UI element that presents the full customer inquiry comment (e.g., when the customer inquiry comment is too long to display in GUI screen 400B) and/or display of additional customer inquiry comments in the cluster.

The trending topic portion 450 also includes a cluster size indication for displaying the size of each cluster and an average customer inquiry size indication for displaying the average size of customer inquiry comments in the cluster. Cluster size may refer to the number of customer inquiry comments in each cluster. The average size of customer inquiry comments in the cluster may refer to the average number of characters in each customer inquiry comment in the cluster.

In some implementations, a given trending topic can be selected for closer review. For example, the user may click on a trending topic to select that topic. This may result in the display of a GUI screen such as the GUI screen 400C of FIG. 4C. FIG. 4C depicts an example GUI screen that displays information about a selected trending topic cluster. The GUI screen 400C displays a list of customer inquiry comments in a content portion 460. The list may include information about each customer inquiry comment such as the date/time at which the customer inquiry comment was received and a copy of the text of the customer inquiry comment. In some implementations, the list of customer inquiry comments can be sorted by date or other parameters.

FIG. 5 is a flow diagram depicting an example method 500 for detecting trending topics in customer inquiries for an entity. One or more steps of the method 500 may be performed by a system such as the customer inquiry management system 114 of FIGS. 1-2 or by an application such as applications 116/124 of FIG. 1.

The method 500 begins, at 505, and proceeds to retrieving customer inquiries from a plurality of data sources, at 510. This may occur, for example, based on a predetermine schedule (e.g., based on a predetermine time frequency such as every 15 minutes) or it may occur as a result of a user request. The data sources may be data sources that store customer support inquiries, incident reports or any other type of customer feedback. The data sources may be selected based on the product/service of interest or based on user interest in a particular product, feature and the like. The customer inquiries are retrieved for both a target time window and for one or more reference time windows.

Once the customer support inquiries are retrieved, method 500 proceeds to detect trending keywords in the target time window as compared to keywords in the one or more reference time windows, at 515. This may be done by using statistical measurements that measure the frequency of occurrence of a keyword in the target time window as compared to the frequency of the keyword in the reference time window. In some implementations, the statistical measurements include calculating a p value and a z score.

After detecting the trending keywords, method 500 proceeds to collect customer inquiries in the target time window that include one or more of the trending keywords, at 520. Method 500 then proceeds, at 525, to measure a weight for each collected customer inquiry based on weights of detected trending keywords in each collected customer inquiry. This may involve measuring a weight for each trending keyword and then combining the weights of the trending keywords in each collected customer inquiry to measure the weight for that collected customer inquiry.

A connection graph for the detected trending keywords and the collected customer inquiries is then generated, at 530, where the connection graph shows a connection between a detected trending keyword and each collected customer inquiry that includes the detected trending keyword. The connection graph displays each detected trending keyword as a node and displays an edge between each trending keyword and each customer inquiry that includes that trending keyword. When a customer inquiry includes two trending keywords, an edge is generated between the two nodes depicting the two trending keywords.

After the connection graph is generated, method 500 proceeds to cluster the detected trending keywords into a plurality of trending topics based on the connection graph, at 535. The connection graph helps identify customer inquiries that should be clustered together because of connections between two or more trending keywords. The trending topics are topics that identify each cluster of the collected customer inquiries based on the one or more trending topics in the cluster.

The trending topics are then ranked based on the measured weights of the collected customer inquiries associated with each trending topic, at 540, before method 500 ends at 545. In some implementations, notification data is also generated and provided for alerting a user based on the detected trending topics. The notification data may make use of the rankings to notify the user or to display the trending topics in a particular order.

Figure 6:
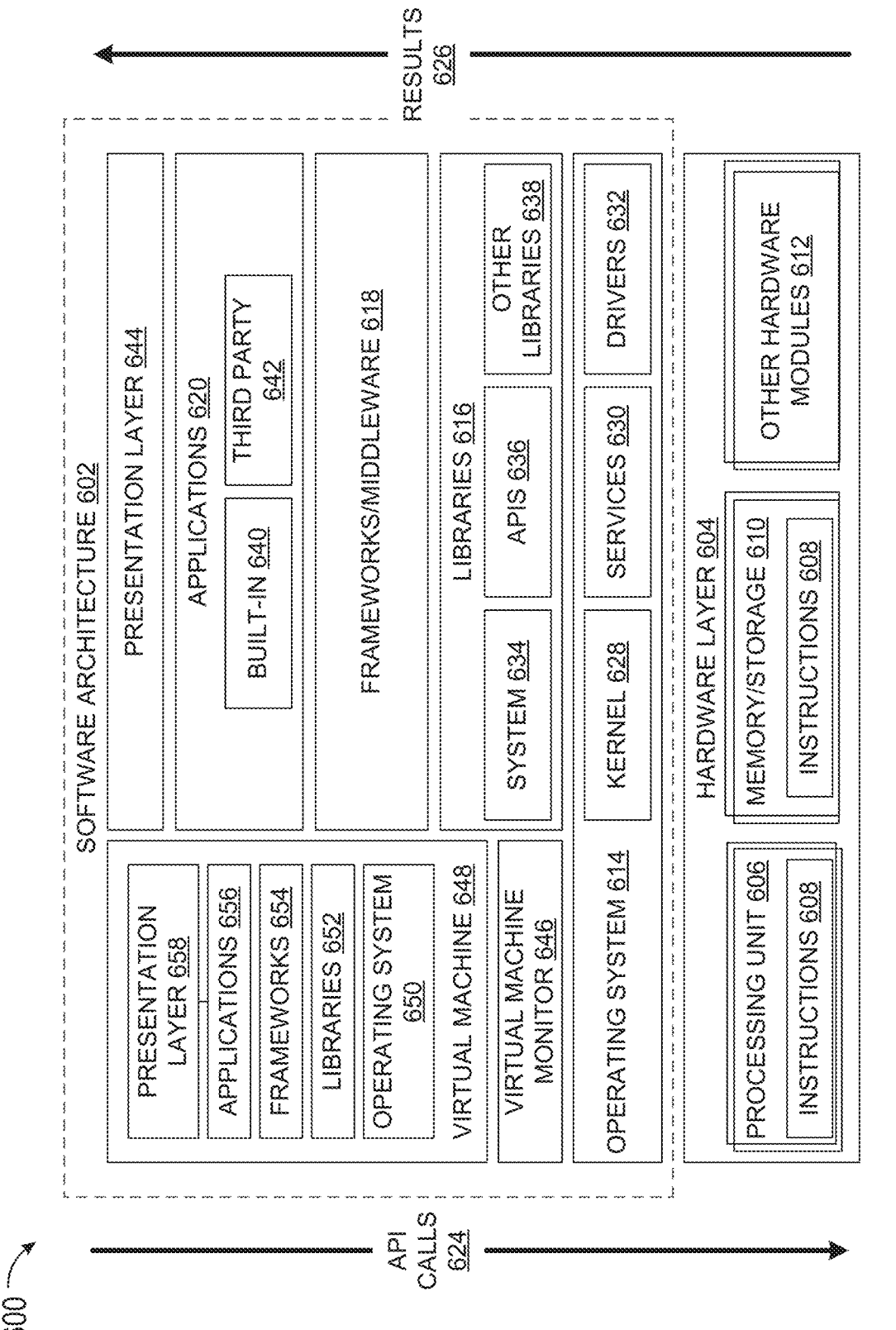
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application providers, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
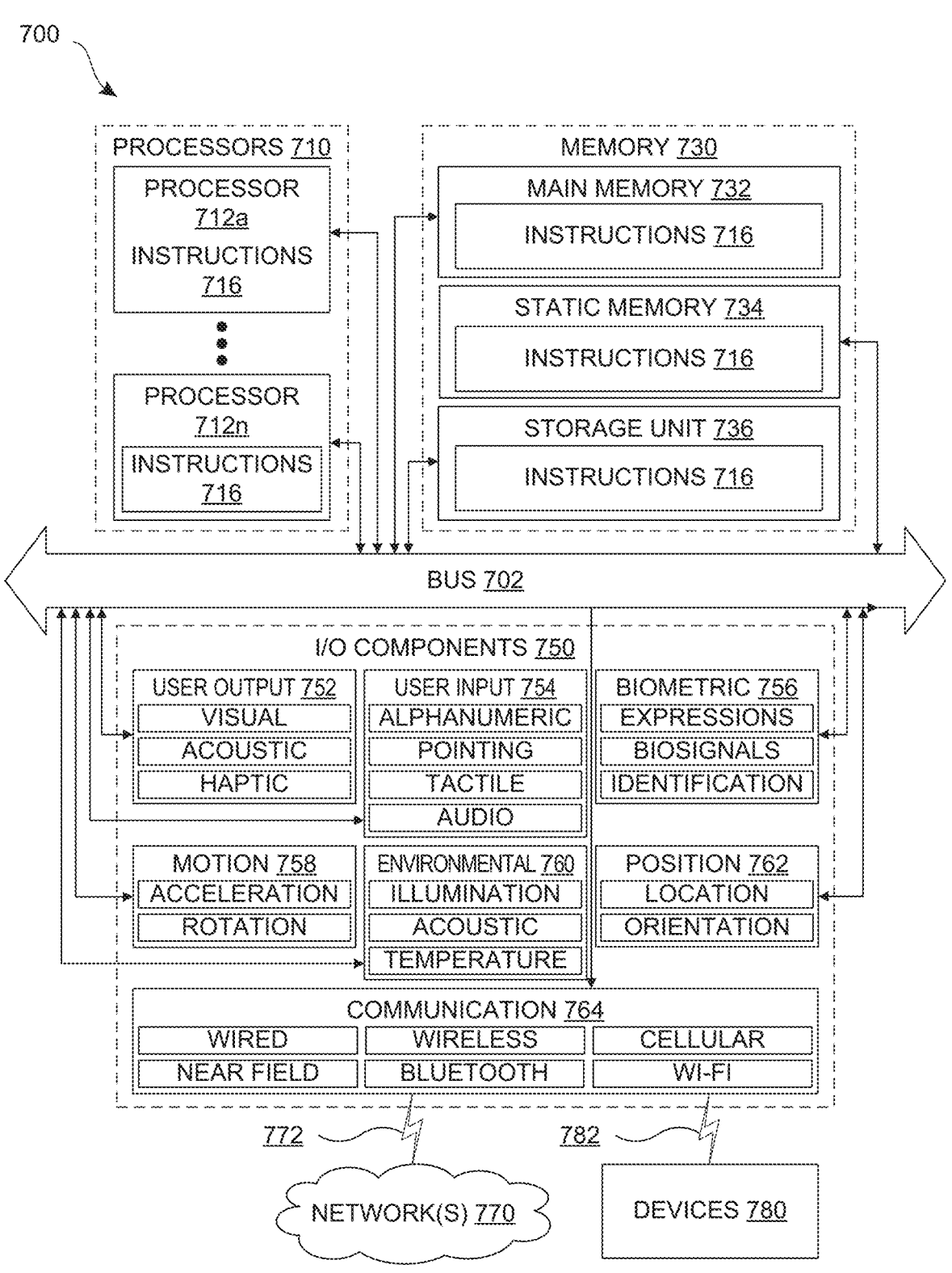
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors $712a$ to $712n$ that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
    a processor; and
    a memory in communication with the processor, the memory comprising executable instructions that, when executed by the processor, cause the data processing system to perform functions of:
        retrieving customer inquiries from a plurality of data sources for a target time window and for one or more reference time windows;
        detecting trending keywords in the target time window by comparing frequency of keywords in the target time window with a frequency of keywords in the one or more reference time windows;

responsive to detecting the trending keywords, collecting customer inquiries in the target time window that include one or more of the trending keywords;

generating a connection graph for the detected trending keywords and the collected customer inquiries, the connection graph showing a connection between a detected trending keyword and each collected customer inquiry that includes the detected trending keyword;

clustering the detected trending keywords into a plurality of trending topics based on the connection graph; and providing notification data for alerting a user of the trending topics.

Item 2. The data processing system of item 1, wherein the connection graph includes a node for each detected trending keyword and an edge from the node to each collected customer inquiry that includes the detected trending keyword associated with the node.

Item 3. The data processing system of item 2, wherein a plurality of the collected customer inquiries include two or more of the detected trending keywords.

Item 4. The data processing system of any preceding item, wherein the graph displays an edge between two nodes when a co-occurrence frequency of detected trending keywords represented by the two nodes exceeds a given threshold.

Item 5. The data processing system of item 4, wherein a depth-first search algorithm is used to identify connected nodes in the connection graph.

Item 6. The data processing system of item 5, wherein the notification data is presented to the user via at least one of a message or a web portal.

Item 7. The data processing system of any preceding item, wherein notification data is provided for trending topics that include a total number of customer inquiries that exceed a threshold value.

Item 8. The data processing system of any preceding item, wherein the trending topics are identified in real-time based on a predetermined schedule.

Item 9. A method for detecting trending topics in customer inquiries comprising:

retrieving customer inquiries from a plurality of data sources for a target time window and for one or more reference time windows;

detecting trending keywords in the target time window as compared to keywords in the one or more reference time windows;

responsive to detecting the trending keywords, collecting customer inquiries in the target time window that include one or more of the trending keywords;

measuring a weight for each collected customer inquiry based on weights of detected trending keywords in each collected customer inquiry;

generating a connection graph for the detected trending keywords and the collected customer inquiries, the connection graph showing a connection between a detected trending keyword and each collected customer inquiry that includes the detected trending keyword;

clustering the detected trending keywords into a plurality of trending topics based on the connection graph; and ranking the trending topics based on the measured weights of the collected customer inquiries associated with each trending topic.

Item 10. The method of item 9, further comprising preprocessing the retrieved customer inquiries.

Item 11. The method of item 10, wherein preprocessing the retrieved customer inquiries includes converting customer inquiries that are retrieved from different data sources to a standardized schema.

Item 12. The method of any of items 9-11, wherein detecting the trending keywords in the target time window is done by utilizing statistical measurements.

Item 13. The method of item 12, wherein the statistical measurements include calculating a p value and a z score.

Item 14. The method of any of items 9-14, wherein the weight for each collected customer inquiry is measured by using a p value from a statistical measurement of the collected customer inquiry and an inverse document frequency parameter.

Item 15. A non-transitory computer readable medium on which are stored instructions that, when executed, cause a programmable device to perform functions of:

retrieving customer inquiries from a plurality of data sources for a target time window and for one or more reference time windows;

detecting trending keywords in the target time window by comparing frequency of keywords in the target time window with a frequency of keywords in the one or more reference time windows;

responsive to detecting the trending keywords, collecting customer inquiries in the target time window that include one or more of the trending keywords;

generating a connection graph for the detected trending keywords and the collected customer inquiries, the connection graph showing a connection between a detected trending keyword and each collected customer inquiry that includes the detected trending keyword;

clustering the detected trending keywords into a plurality of trending topics based on the connection graph; and providing notification data for alerting a user of the trending topics.

Item 16. The non-transitory computer readable medium of item 15, wherein the graph displays an edge between two nodes when a co-occurrence frequency of detected trending keywords represented by the two nodes exceeds a given threshold.

Item 17. The non-transitory computer readable medium of any of items 15 or 16, wherein the instructions when executed, further cause the programmable device to perform functions of measuring a weight for each collected customer inquiry based on weights of detected trending keywords in each collected customer inquiry.

Item 18. The non-transitory computer readable medium of item 17, wherein the instructions when executed, further cause the programmable device to perform functions of ranking the trending topics based on the measured weights of the collected customer inquiries associated with each trending topic.

Item 19. The non-transitory computer readable medium of item 18, wherein the notification data uses the ranking for alerting the user.

Item 20. The non-transitory computer readable medium of item 17, wherein the weight for each collected customer inquiry is measured by using a p value from a statistical measurement of the collected customer inquiry and an inverse document frequency parameter.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
retrieving customer inquiries from a plurality of data sources for a target time window and for one or more reference time windows;
detecting trending keywords in the target time window by comparing a frequency of keywords in the target time window with a frequency of keywords in the one or more reference time windows;
responsive to detecting the trending keywords, collecting customer inquiries in the target time window that include one or more of the trending keywords;
generating a connection graph for the detected trending keywords and the collected customer inquiries, comprising using a depth-first search with the connection graph initially showing a connection between a detected trending keyword of the detected trending keywords and each collected customer inquiry that includes the detected trending keyword of the detected trending keywords;
in response to a query including a new trending keyword, establishing an additional connection with a new node for the new trending keyword to form nodes that represent the customer inquiries and trending keywords to produce non-overlapping connection graphs, wherein inquiries in different connection graphs do not overlap to indicate distinct topics;
clustering the detected trending keywords into a plurality of trending topics based on the connection graph; and
providing notification data for alerting a user of an anomaly indicated by the trending topics.

2. The data processing system of claim 1, wherein the connection graph includes a node for each detected trending keyword and an edge from the node to each collected customer inquiry that includes the detected trending keyword associated with the node.

3. The data processing system of claim 2, wherein a plurality of the collected customer inquiries include two or more of the detected trending keywords.

4. The data processing system of claim 1, wherein the connection graph displays an edge between two nodes when a co-occurrence frequency of detected trending keywords represented by the two nodes exceeds a given threshold.

5. The data processing system of claim 4, wherein a depth-first search algorithm is used to identify connected nodes in the connection graph.

6. The data processing system of claim 5, wherein the notification data is presented to the user via at least one of a message or a web portal.

7. The data processing system of claim 1, wherein notification data is provided for trending topics that include a total number of customer inquiries that exceed a threshold value.

8. The data processing system of claim 1, wherein the trending topics are identified in real-time based on a predetermined schedule.

9. A method for detecting trending topics in customer inquiries comprising:

retrieving customer inquiries from a plurality of data sources for a target time window and for one or more reference time windows;

detecting trending keywords in the target time window as compared to keywords in the one or more reference time windows;

responsive to detecting the trending keywords, collecting customer inquiries in the target time window that include one or more of the trending keywords;

measuring a weight for each collected customer inquiry based on weights of detected trending keywords in each collected customer inquiry;

generating a connection graph for the detected trending keywords and the collected customer inquiries, comprising using a depth-first search with the connection graph initially showing a connection between a detected trending keyword of the detected trending keywords and each collected customer inquiry that includes the detected trending keyword of the detected trending keywords;

in response to a query including a new trending keyword, establishing an additional connection with a new node for the new trending keyword to form nodes that represent the customer inquiries and trending keywords to produce non-overlapping connection graphs, wherein inquiries in different connection graphs do not overlap to indicate distinct topics;

clustering the detected trending keywords into a plurality of trending topics based on the connection graph; and ranking the trending topics based on the measured weights of the collected customer inquiries associated with each trending topic.

10. The method of claim 9, further comprising preprocessing the retrieved customer inquiries.

11. The method of claim 10, wherein preprocessing the retrieved customer inquiries includes converting customer inquiries that are retrieved from different data sources to a standardized schema.

12. The method of claim 9, wherein detecting the trending keywords in the target time window is done by utilizing statistical measurements.

13. The method of claim 12, wherein the statistical measurements include calculating a p value and a z score.

14. The method of claim 9, wherein the weight for each collected customer inquiry is measured by using a p value from a statistical measurement of the collected customer inquiry and an inverse document frequency parameter.

15. A non-transitory computer readable medium on which are stored instructions that, when executed, cause a programmable device to perform functions of:

retrieving customer inquiries from a plurality of data sources for a target time window and for one or more reference time windows;

detecting trending keywords in the target time window by comparing a frequency of keywords in the target time window with a frequency of keywords in the one or more reference time windows;

responsive to detecting the trending keywords, collecting customer inquiries in the target time window that include one or more of the trending keywords;

generating a connection graph for the detected trending keywords and the collected customer inquiries, comprising using a depth-first search with the connection graph initially showing a connection between a detected trending keyword of the detected trending keywords and each collected customer inquiry that includes the detected trending keyword of the detected trending keywords;

in response to a query including a new trending keyword, establishing an additional connection with a new node for the new trending keyword to form nodes that represent the customer inquiries and trending keywords to produce non-overlapping connection graphs, wherein inquiries in different connection graphs do not overlap to indicate distinct topics;

clustering the detected trending keywords into a plurality of trending topics based on the connection graph; and providing notification data for alerting a user of an anomaly indicated by the trending topics.

16. The non-transitory computer readable medium of claim 15, wherein the connection graph displays an edge between two nodes when a co-occurrence frequency of detected trending keywords represented by the two nodes exceeds a given threshold.

17. The non-transitory computer readable medium of claim 15, wherein the instructions when executed, further cause the programmable device to perform functions of measuring a weight for each collected customer inquiry based on weights of detected trending keywords in each collected customer inquiry.

18. The non-transitory computer readable medium of claim 17, wherein the instructions when executed, further cause the programmable device to perform functions of ranking the trending topics based on the measured weights of the collected customer inquiries associated with each trending topic.

19. The non-transitory computer readable medium of claim 18, wherein the notification data uses the ranking for alerting the user.

20. The non-transitory computer readable medium of claim 17, wherein the weight for each collected customer inquiry is measured by using a p value from a statistical measurement of the collected customer inquiry and an inverse document frequency parameter.

* * * * *